Dec. 1, 1931.　　　LE ROY ASKAM　　　1,834,372

WINDSHIELD CLARIFIER

Filed March 1, 1928

INVENTOR
*Le Roy Askam*
BY
*Chamberlain & Newman*
ATTORNEYS

Patented Dec. 1, 1931

1,834,372

UNITED STATES PATENT OFFICE

LE ROY ASKAM, OF MILFORD, CONNECTICUT

WINDSHIELD CLARIFIER

Application filed March 1, 1928. Serial No. 258,181.

This invention refers to wind shield clarifiers and more particularly relates to means for preventing the accumulation of snow and ice upon the outside of that portion of a wind shield positioned directly in front of the driver. The invention includes a warming device adapted for attachment to the side of a wind shield whereby the glass is kept sufficiently warm to prevent the freezing of water and snow against that portion of the shield adjacent to the warming device and through which the driver views the road ahead.

The warming device further includes a chamber having therein one or more electrical heating units and is provided with a cold air intake and a hot air outlet constructed and arranged to provide a flow of hot air against the wind shield glass in a way to warm the same sufficient to prevent the formation of ice on the outside as above suggested.

The heating device may obviously be of any required size necessary to heat so much of the wind shield as may be desired and as shown is preferably designed and proportioned to be positioned against the inside of the wind shield just above the point of vision of the driver, through the glass and so that the current of warm air may be deflected down against the glass rather than up. The device is arranged to be heated by one or more units adapted to be connected to the electric power of the automobile, such for instance, as a storage battery.

With these and other objects in view, the invention resides and consists in the construction and novel combination and arrangement of parts hereinafter more fully described, illustrated in the accompanying drawings, and pointed out in the claims hereto appended, it being understood that various changes in the form, proportion, size, and minor details of construction within the scope of the claims may be resorted to without departure from the spirit, or sacrificing any of the advantages of the invention.

Figure 1:
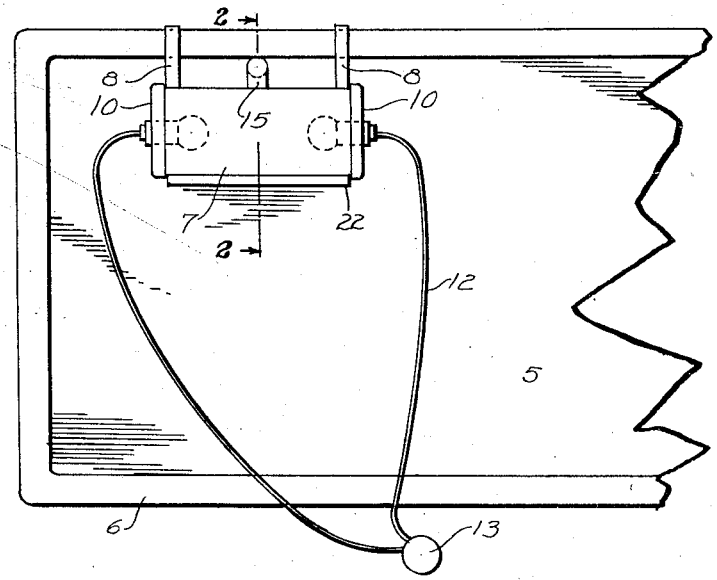
Figures 2, 3:
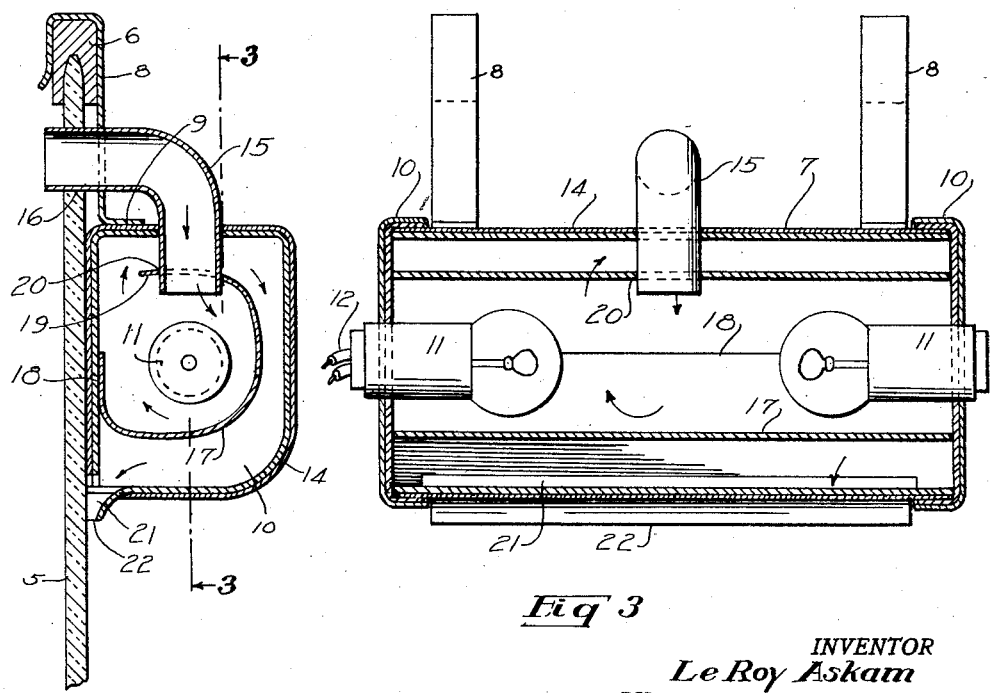

Similar characters of reference denote like or corresponding parts throughout the several figures of the accompanying drawings forming a part of this specification and upon which Fig. 1 shows an elevational view of one end portion of a wind shield having my clarifying device applied thereon;

Fig. 2 is an enlarged central vertical sectional view taken on line 2 of Fig. 1; and Fig. 3 shows a longitudinal sectional view taken on line 3—3 of Fig. 2.

Referring in detail to the characters of reference marked upon the drawings, 5 represents the wind shield glass, and 6 the frame therefor. Both of these may obviously be of any preferred design or construction and have no material bearing upon the invention.

My clarifier as before stated is adapted to be attached and removed from a wind shield when desired, it being obviously not necessary or desirable to have it in position except when needed to clear the wind shield or to prevent the formation of ice thereon. The clarifier includes an elongated tubular type of heating chamber 7 to which the additional features of the invention are associated.

The clarifier is made attachable to the top portion of the frame of the wind shield by means of a pair of strap hooks 8—8 that are secured to the top of the heating chamber as at 9. The two end portions of the heating chamber are enclosed by removable caps 10—10 which are substantially alike in construction and serve each to carry heating elements 11 which may be in the form of an electrical lamp as illustrated in the drawings or electric coils, not shown, but which can be secured in substantially the same way. These heating elements are each connected with one end of a wire 12, the opposite end of which may be provided with a plug 13 adapted to be inserted in a socket on the dashboard of the car, which socket in turn is electrically connected to the battery or other source of electric power.

The chamber 7 as well as the end caps 10 forming the heating chamber are each preferably provided with asbestos or other insulative covering 14. A short pipe 15 which is preferably of an L-shape is mounted in the top side of the chamber so that its inner end projects slightly into the compartment while the other end is projected forward and extends through a hole 16 of the glass so as to allow an unobstructed flow of air into the mouth of the pipe so as to be discharged from the inner end into the chamber substantially midway of the two heating elements.

A coiled sheet of metal forming a deflector 17 is mounted within the length of the chamber having one of its longitudinal edge portions secured at 18 to the inner side of the back of the casing and its other edge portion 19 disposed slightly forward of the intake pipe 15 in spaced relation to the top and rear walls of the chamber. A hole 20 is provided through this portion of the deflector adjacent to its free edge to accommodate the before mentioned intake pipe. An elongated outlet 21 is provided for the casing and includes a lip 22 which serves to better direct the current of air passing out of the chamber against the glass.

This deflector serves the double purpose of insuring a proper circulation and consequent heating of the air by the heating elements within the chamber as it passes through the chamber and also serves to prevent any rays of light from the heating unit being deflected against the glass.

It will be readily understood that with the device as applied to a wind shield and connected for electrical operation as herein shown the heating elements will serve to heat the air within the compartment that the asbestos or other suitable covering will serve to retain the heating while the intake pipe admits a supply of fresh air into the box and the outlet will serve to deflect that same air when warmed by the heating unit against the inner surface of that portion of the wind shield lying immediately below the clarifier.

Having thus described my invention, what I claim and desire to secure by Letters Patent is:—

1. A wind shield clarifier comprising a casing, a heating element in said casing, an inlet pipe attached to the upper portion of said casing and extended forward therefrom, an outlet opening in the lower forward portion of said casing, all arranged to insure a circulation of air downward from top to bottom through said casing and forward therefrom.

2. A wind shield clarifier comprising a heating unit, including a casing, having a partition therein forming two chambers with an air passage from one to the other, a heating unit in one of said chambers, an inlet pipe projected from the casing and extended into the chamber having the heating unit, an air outlet in the other of said chambers, and means for supporting the same on a wind shield.

3. A wind shield clarifier comprising a heating unit, including an elongated casing, having a longitudinal partition therein forming an inner and outer chamber with an air passage through its upper portion from one to the other of said chambers, an inlet pipe projected from the casing and extended in the inner chamber, an elongated air outlet in the lower portion of the casing from the outer chamber, and a heating unit within the said inner chamber.

4. A wind shield clarifier comprising an elongated casing, removable end caps closing the casing, a detachable heating element mounted upon each cap within the casing, a fresh air inlet intermediate of said heating element, and an outlet opening arranged in opposed relation to the inlet to project a flow of warm air against a wind shield.

Signed at Bridgeport in the county of Fairfield and State of Connecticut, this 29th day of February, A. D. 1928.

LE ROY ASKAM.